(12) United States Patent
Chakrabarti et al.

(10) Patent No.: US 8,715,439 B2
(45) Date of Patent: May 6, 2014

(54) METHOD FOR MAKING HYBRID METAL-CERAMIC MATRIX COMPOSITE STRUCTURES AND STRUCTURES MADE THEREBY

(75) Inventors: Buddhadev Chakrabarti, Walnut, CA (US); Leanne Lehman, Aliso Viejo, CA (US); Ali Yousefiani, Arcadia, CA (US); William P. Keith, Lakewood, CA (US)

(73) Assignee: The Boeing Company, Chicago, IL (US)

( * ) Notice: Subject to any disclaimer, the term of this patent is extended or adjusted under 35 U.S.C. 154(b) by 582 days.

(21) Appl. No.: 12/044,052

(22) Filed: Mar. 7, 2008

(65) Prior Publication Data

US 2009/0226746 A1 Sep. 10, 2009

(51) Int. Cl.
*C03B 29/00* (2006.01)
*C04B 33/34* (2006.01)
*B22F 3/26* (2006.01)

(52) U.S. Cl.
USPC ............... 156/89.11; 156/89.28; 428/545

(58) Field of Classification Search
USPC ............... 156/89.28, 89.11; 428/545
See application file for complete search history.

(56) References Cited

U.S. PATENT DOCUMENTS

| | | | | |
|---|---|---|---|---|
| 2,975,078 A | * | 3/1961 | Rayfield | 428/384 |
| 4,398,980 A | | 8/1983 | Kelsey, Jr. et al. | |
| 4,740,429 A | * | 4/1988 | Tsuno | 428/627 |
| 4,915,760 A | * | 4/1990 | Singh et al. | 156/89.27 |
| 5,223,064 A | | 6/1993 | Gadkaree | |
| 5,258,084 A | * | 11/1993 | Leung et al. | 156/89.26 |
| 5,488,017 A | * | 1/1996 | Szweda et al. | 501/95.2 |
| 5,501,906 A | | 3/1996 | Deve | |
| 5,707,471 A | * | 1/1998 | Petrak et al. | 156/89.27 |
| 5,951,254 A | * | 9/1999 | Sikorski et al. | 416/224 |
| 6,257,366 B1 | * | 7/2001 | Gerretsen et al. | 181/213 |
| 7,282,274 B2 | | 10/2007 | Millard et al. | |
| 2001/0005061 A1 | * | 6/2001 | Holsinger | 264/257 |
| 2002/0135093 A1 | * | 9/2002 | Davis | 264/102 |
| 2004/0242095 A1 | * | 12/2004 | Prakash | 442/19 |
| 2005/0100726 A1 | * | 5/2005 | Millard et al. | 428/312.6 |
| 2008/0149255 A1 | | 6/2008 | Whiteker et al. | |

FOREIGN PATENT DOCUMENTS

| | | |
|---|---|---|
| CN | 1105717 A | 7/1995 |
| EP | 0783960 A2 | 7/1997 |
| EP | 1529765 A1 | 5/2005 |
| EP | 1529950 A1 | 5/2005 |
| EP | 2098496 A2 | 9/2009 |
| WO | WO 0104979 A1 * | 1/2001 |

OTHER PUBLICATIONS

Partial European Search Report, dated Apr. 5, 2012, regarding Application No. EP09250640 (EP2098496), 7 pages.
Tarasov, "The Deposition of Improved Nickel Coatings on Kovar Articles," Measurement Techniques, vol. 47, No. 5, pp. 487-488, May 2004.

* cited by examiner

*Primary Examiner* — Philip Tucker
*Assistant Examiner* — Alex Efta
(74) *Attorney, Agent, or Firm* — Yee & Associates, P.C.

(57) ABSTRACT

A laminated ceramic matrix composite structure is strengthened with one or more layers of a metal reinforcement. The metal reinforcement is selected to provide optimal strength and thermal compatibility with the ceramic matrix composite. The metal reinforcement includes an outer oxidized layer that bonds to the ceramic matrix composite. It may also include a barrier layer on the surface of the metal that helps prevent further oxidation. The structure is formed using standard composite prepreg layup techniques.

20 Claims, 5 Drawing Sheets

METHOD FOR MAKING HYBRID METAL-CERAMIC MATRIX COMPOSITE STRUCTURES AND STRUCTURES MADE THEREBY

TECHNICAL FIELD

This disclosure generally relates to laminated composite structures, especially those using a ceramic matrix, and deals more particularly with a method for making a hybrid metal-reinforced ceramic matrix composite structure, as well as a composite structure produced thereby.

BACKGROUND

Ceramic matrix composite (CMC) structures may be used in aerospace and other applications because of their ability to withstand high operating temperatures. For example, CMC structures may be used where parts are subjected to high temperature exhaust gases in aircraft applications. Generally, laminated CMC composite structures may have relatively low impact resistance, particularly where the impact is localized as a result of sudden point loads. This low impact resistance stems in part from the fact that these CMC laminates may be formed from fibers held in a ceramic matrix, which may have less than optimal ability to absorb or dampen the energy resulting from localized impacts.

One solution to the problem mentioned above consists of adding additional layers of CMC laminate materials in order to strengthen the structure, however this solution may be undesirable in some applications because of the additional weight it adds to the aircraft component.

Hybrid laminate materials are known in which composite layers comprising continuous fibers in a resin matrix are interspersed with layers containing metal. For example, TiGr laminates have been developed comprising interspersed layers of graphite composite and titanium. Similarly, laminates having glass composite layers interspersed with aluminum layers are also known. However, none of these prior material systems is readily adaptable for use in strengthening CMC structures.

Accordingly, there is a need for a hybrid metal-ceramic matrix composite structure in which the CMC laminates are reinforced to resist localized impact loads, but yet avoid materials that add substantial weight to the structure. There is also a need for a method of making the hybrid structures mentioned above that is both repeatable and well suited for production environments.

SUMMARY

The disclosed embodiments provide a method of making a hybrid metal-ceramic matrix composite structure exhibiting greater resistance to localized impact loading and improved ductility. Additional benefits may also include, but are not limited to, enhanced lightning strike capability and higher thermal conductivity.

According to one disclosed method, a hybrid metal-ceramic matrix composite structure is fabricated by: forming a reinforcing layer containing a metal reinforcement; forming an oxide on the surface of the metal reinforcement; forming a layup including placing the reinforcing layer between layers of continuous ceramic fibers pre-impregnated with a ceramic matrix; and, curing the layup to bond the layers of ceramic fibers to the reinforcing layer. Forming the reinforcing layer may include rolling a mesh pattern into a sheet of metal. The layer of oxide may be formed by applying a metal coating on the surface of the metal reinforcement, and oxidizing the metal coating. The method may further include sintering the ceramic matrix by heating the cured layup in a furnace for a pre-selected period of time.

According to another disclosed method embodiment, a composite structure is fabricated by: providing multiple plies of continuous ceramic fibers pre-impregnated with a ceramic matrix; forming at least one reinforcing ply containing a continuous metal reinforcement having a coefficient of thermal expansion (CTE) generally matching the CTE of the ceramic fibers; forming a layup by placing the reinforcement ply between multiple plies of ceramic fibers; and, bonding the reinforcing ply to the ceramic matrix by curing the layup at elevated temperature. The reinforcing ply may be formed by weaving metal and ceramic fibers together to form a metal-ceramic mesh. The reinforcing ply may also be formed by: providing a sheet of nickel-cobalt ferrous alloy having the thermal expansion characteristics of borosilicate glass; applying a nickel coating on the alloy sheet, and heating the alloy sheet to a temperature sufficient to oxidize the nickel coating.

According to another disclosed embodiment, a laminated composite structure is provided, comprising: multiple layers of ceramic fibers held in a ceramic matrix; and, at least one reinforcing layer including a metal bonded to the ceramic matrix and having a coefficient of thermal expansion (CTE) generally matching the CTE of the ceramic fibers. The metal in the reinforcing layer may comprise a mesh, a perforated metal foil, a woven braid, foil strips, or wires. The surface of the metal includes an oxide barrier coating which may be a metal, a glass or a layered impermeable oxide.

The disclosed embodiments satisfy a need for ceramic matrix composite structures that are reinforced to resist mechanical impact loads as well as stress from thermal cycling, while remaining light-weight.

Other features, benefits and advantages of the disclosed embodiments will become apparent from the following description of embodiments, when viewed in accordance with the attached drawings and appended claims.

BRIEF DESCRIPTION OF THE ILLUSTRATIONS

DETAILED DESCRIPTION

Figure 1:
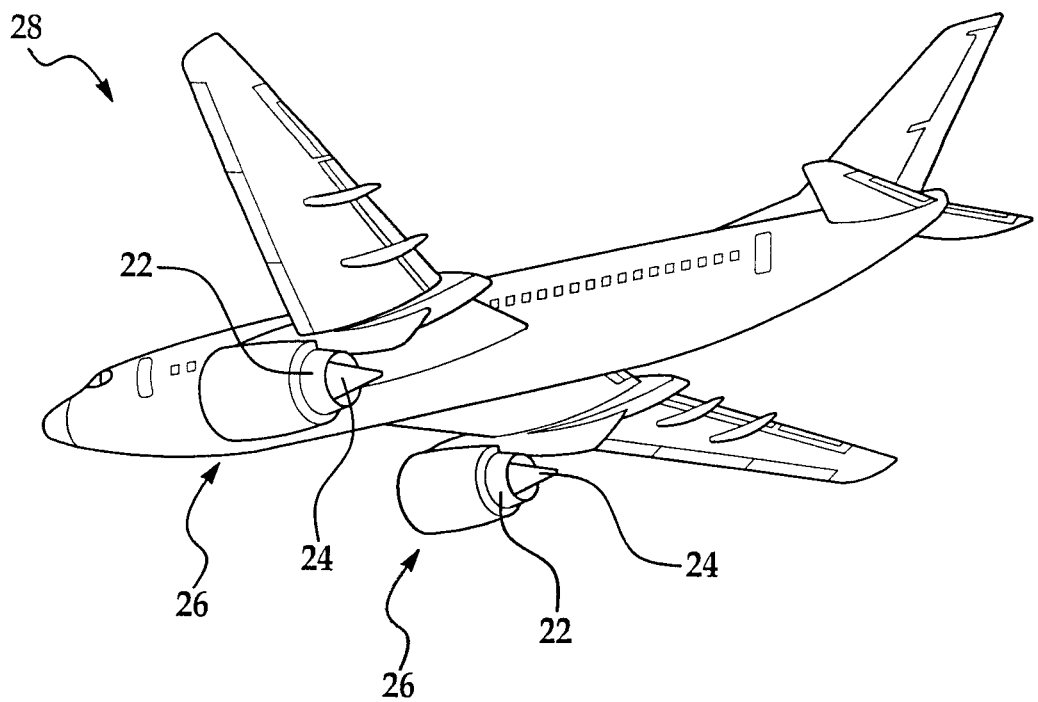
FIG. 1 is a perspective view of an airplane having high temperature, jet engine components that may be fabricated according to the disclosed embodiments.

Referring first to FIGS. 1-4, a hybrid metal-ceramic matrix composite (CMC) structure 20 may be used in parts subjected to high temperatures, such as, without limitation, the exhaust nozzle 22 and exhaust plug 24 on jet engines 26 of an aircraft 28. As used herein, the term "ceramic matrix composite" refers to a composite created from continuous fibers bound in a ceramic matrix. The fibers can be in tape or cloth form and may include, but are not limited to, fibers formed from silicon carbide, alumina, aluminosilicate, aluminoborosilicate, carbon, silicon nitride, silicon boride, silicon boronitride, and similar materials. The ceramic matrix may include, but is not limited to, matrices formed from aluminosilicate, alumina, silicon carbide, silicon nitride, carbon, and similar materials.

The hybrid metal-CMC structure 20 broadly includes one or more reinforcing layers 30 interleafed between multiple layers 32 comprising continuous ceramic fibers held in a ceramic matrix. In the illustrated example, the hybrid metal CMC structure 20 comprises, from top to bottom as viewed in FIG. 3, two layers 32 of ceramic matrix composite, a single reinforcing layer 30, eight layers 32 of ceramic matrix composite, one reinforcing layer 30, and two layers 32 of ceramic matrix composite. A variety of other sandwich constructions are possible depending on the application. The hybrid metal-CMC structure 20 may contain as few as one reinforcing layer 30 or a plurality of such layers 30 interleafed at various positions between the layers 32 of ceramic matrix composite.

Figure 2:
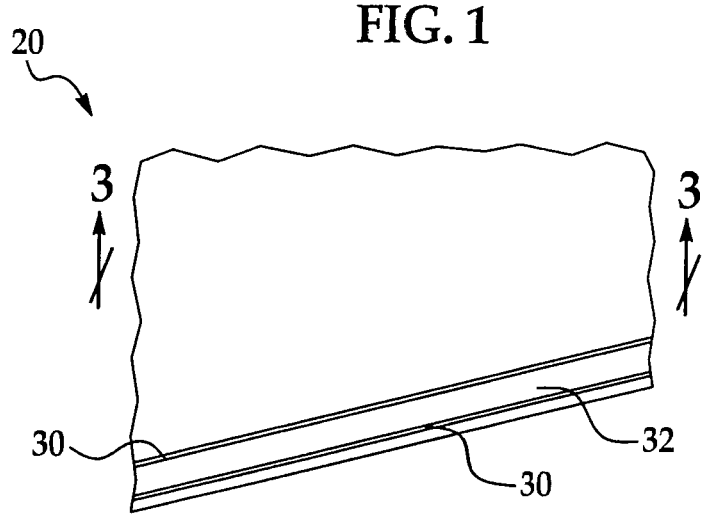
FIG. 2 is a perspective view of a section of a hybrid metal-ceramic composite structure according to one of the disclosed embodiments.
Figure 3:
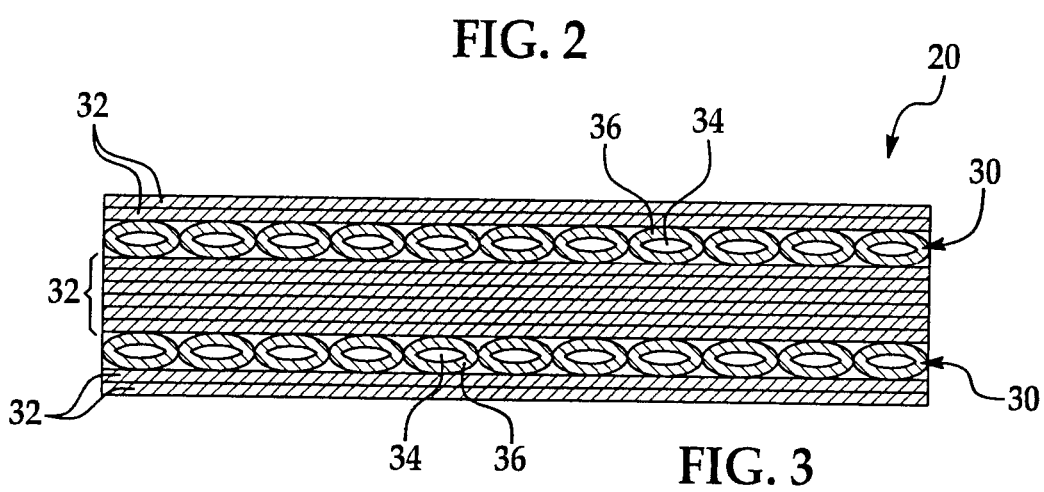
FIG. 3 is a sectional view taken along the line 3-3 in FIG. 2.
Figure 4:
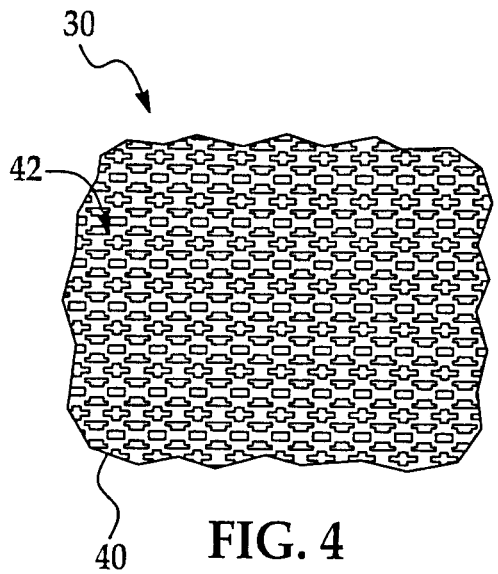
FIG. 4 is a plan view of a rolled metal screen mesh used as reinforcement in the composite structure shown in FIG. 3.

In the embodiment illustrated in FIGS. 2-4, the reinforcing layers 30 each include a metal screen mesh 40 having openings 42 that may be penetrated by the ceramic matrix during fabrication of the hybrid metal-CMC structure 20, resulting in fusion of layers 30, 32. The mesh 40 includes interconnected metal elements 34 having an outer oxide layer 36 that is bonded to the surrounding ceramic matrix.

Figure 5:
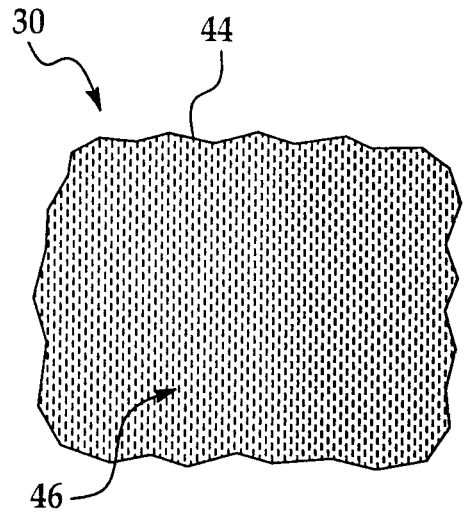
FIG. 5 is a plan view showing a perforated metal foil mesh comprising an alternate form of the reinforcement.
Figure 6:
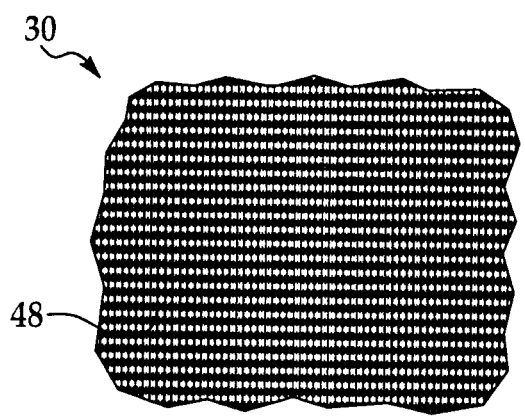
FIG. 6 is a plan view showing a woven metal braid comprising another alternate form of the reinforcement.
Figure 7:
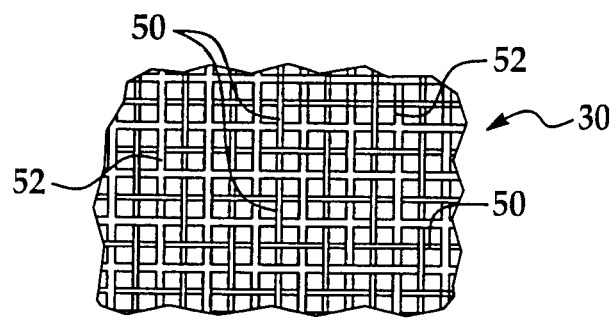
FIG. 7 is a plan view of interwoven metal and ceramic fiber comprising another alternate form of the reinforcement.

The reinforcing layer 30 includes metal that may be in any of various continuous forms. For example, as shown in FIG. 5, the reinforcing layer 30 may comprise a metal foil sheet 44 containing perforations 46. Alternatively, as shown in FIG. 6 the reinforcing layer 30 may comprise a woven metal braid 48. As shown in FIG. 7, it may be possible to form the reinforcing layer 30 from interwoven metal fibers 50 and ceramic fibers 52.

Figure 8:
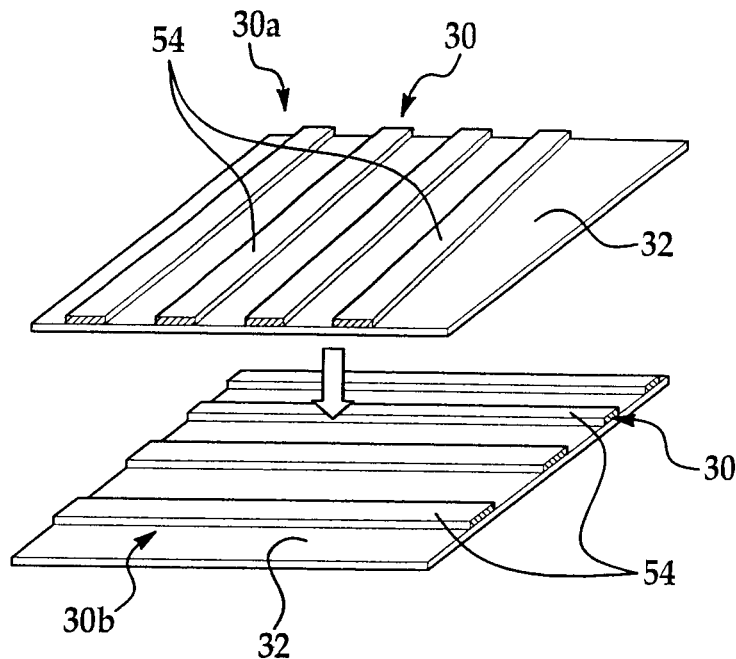
FIG. 8 is a perspective view showing two orthogonally arranged sets of foil strips comprising another alternate form of the reinforcement.

FIG. 8 illustrates another form of the reinforcing layer 30 in which the metal reinforcement is formed by parallel strips 54 of metal foil. The parallel strips 54 of metal foil in multiple layers 30a, 30b may be arranged at differing angles for example, orthogonally, where more than one reinforcing layer 30 is used to strengthen the hybrid structure 20.

Figure 9:
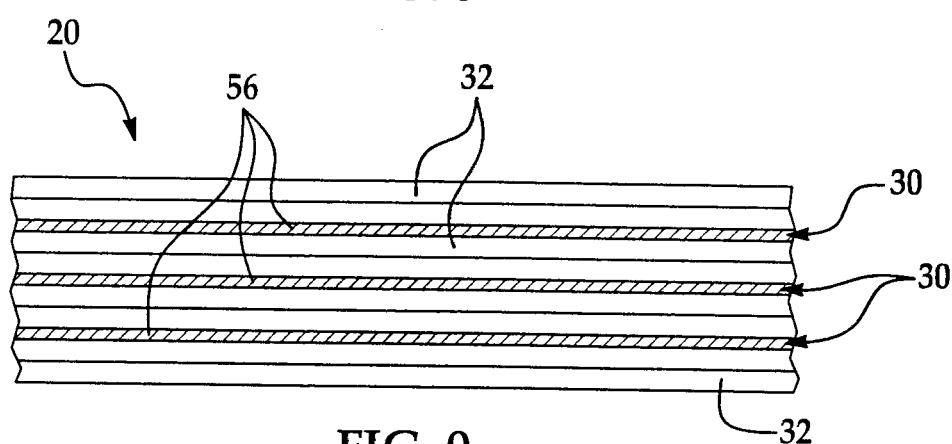
FIG. 9 is a sectional view of a CMC structure reinforced with continuous, interleafed sheets of metal comprising another alternate form of the reinforcement.
Figure 10:
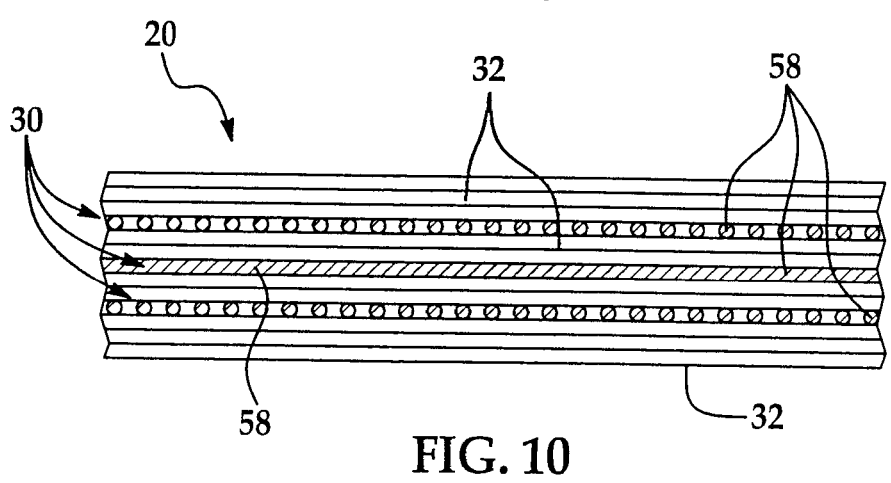
FIG. 10 is a sectional view of a CMC structure with orthogonally arranged metal wires comprising another alternate form of the reinforcement.

FIG. 9 illustrates the possibility of using continuous, flat metal foil sheets 56 sandwiched between layers 32 of ceramic matrix composite. Still another embodiment is shown in FIG. 10 in which the reinforcing layers 30 are formed by parallel metal wires 58 that may be orthogonally arranged in multiple layers 30.

The metal 34 used in the reinforcing layer 30 may have a coefficient of thermal expansion (CTE) that generally matches, and may be as close as possible to, the CTE of the ceramic matrix composite. Where the ceramic matrix composite comprises alumina fibers in an aluminosilcate matrix, a metal 34 may be selected that is relatively soft and has a relatively low CTE in order to form a satisfactory bond with the CMC. For example, iron and nickel-based metal alloys such as KOVAR® and Alloy 42 may be good candidates for use with alumina fiber based CMCs. KOVAR® is a nickel-cobalt ferrous alloy having thermal expansion characteristics similar to borosilicate glass which are approximately $5 \times 10^{-6}$/K between 30° C. and 200° C., to approximately $10 \times 10^{-6}$/K at 800° C. KOVAR® typically comprises 29% nickel, 17% cobalt, 0.2% silicon, 0.3% manganese, and 53.5% iron (by weight). The term KOVAR® is sometimes used as a general term for FeNi alloys exhibiting the thermal expansion properties mentioned above.

Other "superalloys" in which the base alloying element is usually nickel, cobalt, or nickel-iron, may also be suitable. Superalloys exhibit good mechanical strength and creep resistance at high temperatures, good surface stability, and corrosion and oxidation resistance. It may be possible, however to employ metals 34 that are harder and have higher CTEs, depending upon the materials used as the ceramic matrix 38 (shown in FIG. 13).

The exact geometry of the reinforcing layer 30 will vary depending upon the application, and consideration may be given to a variety of parameters in selecting feature size and geometry of the alloy metal 34 included in reinforcing layer 30, including, but not limited to: gauge or thickness; open area per square inch; distribution per square inch; and, patterns and angles.

Figure 11:
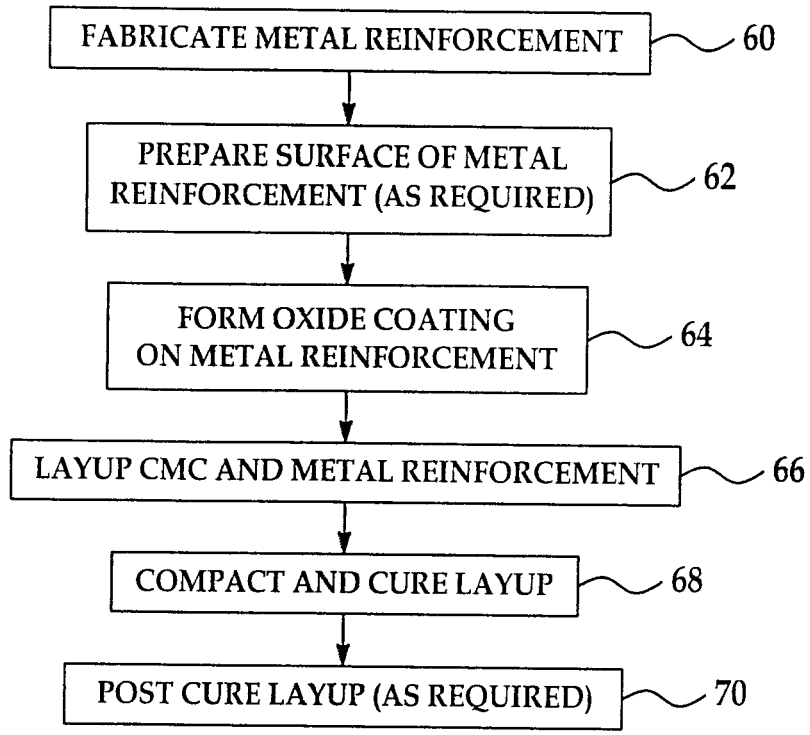
FIG. 11 is a simplified flow diagram of one method embodiment.

Attention is now directed to FIG. 11 which illustrates, in simplified form, the steps of one method embodiment for making the hybrid metal-CMC structure 20. Beginning at 60, the metal reinforcement 34 is fabricated using any of various processes such as roll forming a metal foil, weaving, braiding, or extrusion, to name only a few. Next, at step 62, it may be necessary to prepare the surface of the metal reinforcement 34, as will be discussed in more detail below. For example, it may be necessary to apply a barrier coating (not shown) to the metal reinforcement 34 in order to protect the underlying metal alloy from excessive oxidation or other chemical changes during the subsequent processing steps or after the hybrid metal-CMC structure 20 is placed into use.

At step 64, an oxide coating 36 (FIG. 3) is formed over the surface of the metal reinforcement 34, or over the barrier coating where applicable. As will be discussed later, the oxide coating 36 applied at 64 is intended to enhance the bond created between the metal reinforcement 34 and the ceramic matrix 38. The exact type of metal oxide will depend upon the type of ceramic oxide used in the ceramic matrix 38.

Next, at step 66, a layup is formed comprising multiple CMC layers 32 between which one or more of the reinforcing layers 30 have been interleafed. At 68, the layup formed at 66 is compacted and cured using conventional techniques and equipment, such as heated presses, vacuum bagging and autoclaving. Finally, as shown at step 70, the cured layup is subjected to post cure processing that may include, but without limitation, sintering in which the cured layup is heated in a furnace in order to fuse the ceramic matrix 38.

Figure 13:
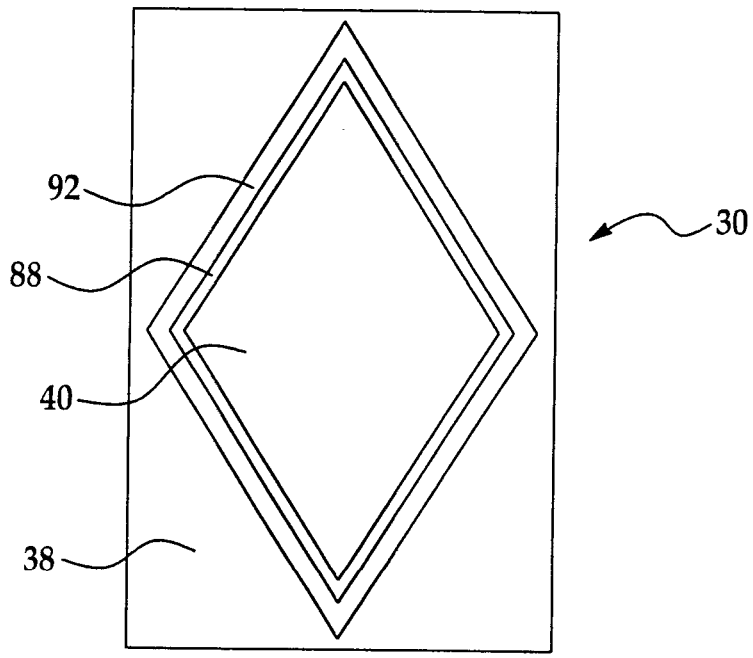
FIG. 13 is an enlarged, plan view of a portion of the wire mesh produced by the method shown in FIG. 12.
Figure 12:
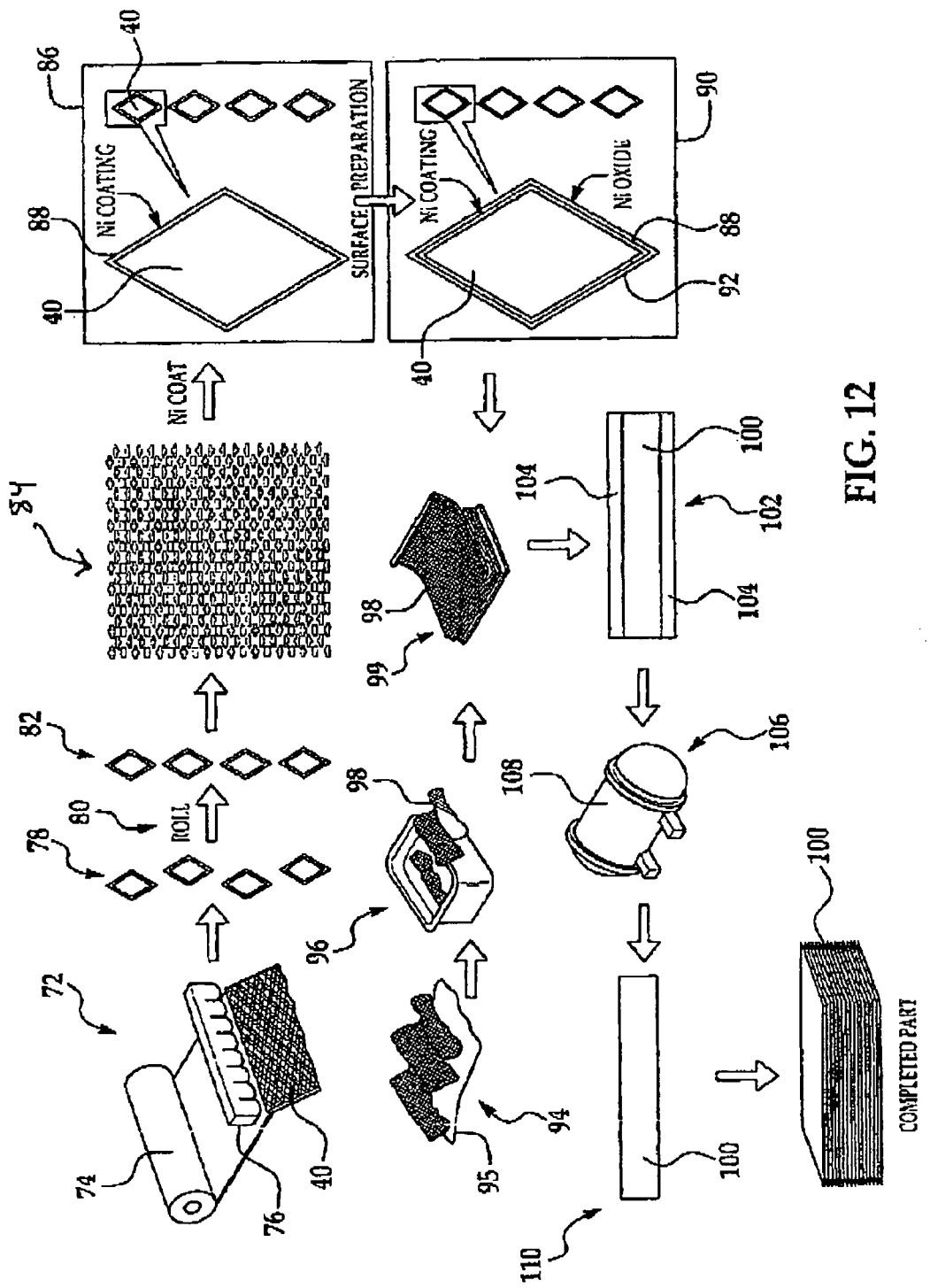
FIG. 12 is a more detailed diagrammatic flow diagram showing another method embodiment.

Attention is now directed to FIGS. 12 and 13 which diagrammatically illustrate additional details of a method for fabricating the hybrid metal-CMC structure 20 using selected materials. Beginning at 72, a selected metal alloy foil 74, such as 0.005 inch thick KOVAR® is slit and stretched using a roll tool 76 to form a metal mesh 40 having, for example, 100 openings per square inch. After being slit and stretched, the mesh 40 may be somewhat uneven in cross section, as shown at 78. Consequently, the mesh 40 is rolled and flattened at 80 so that the openings in the mesh 40 are even, as shown at 82.

The mesh 40 is then coated at 84 with a suitable metal such as nickel. As shown at 86, the nickel coating 88 surrounds the KOVAR® mesh 40. At step 90, the nickel coated KOVAR® mesh 40 is heat treated, for example at 1500° F. for three hours in order to oxidize the surface of the nickel coating 88 and thereby produce an outer layer 92 of nickel oxide covering the nickel coating 88. It should be noted here that while a nickel coating 88 has been illustrated in connection with the disclosed embodiment, other suitable barrier coatings are possible, including glass type coatings and complex layered, impermeable oxides.

At step 94, woven or knitted sheets 95 of ceramic fibers are immersed in a ceramic slurry at 96 to form prepreg ceramic fiber sheets 98. At 99, a layup 98 is formed by stacking the prepreg sheets 98 with one or more interleafed reinforcing layers 30 containing the metal reinforcement 34. In one embodiment, a suitable layup 98 may comprises two plies of N610 CMC prepreg sheets 98, followed by one sheet of the mesh 40, eight plies of the prepreg sheets 98, one ply of the mesh 40, followed by two plies of the prepreg sheets 98.

Next, at 102, the layup 100 is placed between caul plates 104 and is sealed in a vacuum bag (not shown). The vacuum bagged layup 100 is then placed on a platen press (not shown) or is placed in an autoclave 108, as shown at step 106. The layup 100 is cured at appropriate temperatures and pressures for a pre-selected period of time. For example, the layup 100 described above may be subjected to a low temperature cure profile that may range from 150 to 450° F. and pressures up to 100 psi.

At step 110, the part 100 may be subjected to post-cure processing, such as sintering within a furnace (not shown). For example, the part 100 may be subjected to an elevated temperature, pressureless post cure profile in a furnace that may range from 500° F. to 2200° F.

FIG. 13 illustrates more clearly a section of the KOVAR® mesh 40 having a nickel coating 88 covered by a layer of nickel oxide 92 that forms an interfacial bond with the surrounding, ceramic matrix 38. The strength of the bond between the nickel oxide 92 and the ceramic matrix 38 is tailored to optimize the properties of the hybrid composite.

The process described in connection with FIG. 12 utilizes the nickel coating 88 as a barrier between the nickel oxide coating 92 which may be required to bond the KOVAR® 40 to the ceramic matrix 38. As previously mentioned, the underlying nickel coating 88 prevents excessive oxidation of the KOVAR® mesh 40 which may occur either during the fabrication stages of the hybrid metal-CMC structure 20, or as a result of sustained elevated temperatures when the structure 20 is placed in service. However, depending upon the metal alloy that is chosen for the metal reinforcement layer 30, it may not be necessary to employ a barrier coating, such as the nickel coating 88, but rather it may be possible to directly oxidize the outer surface of the base metal from which the reinforcement layer 30 is fabricated. Also, other techniques may be used to control the possible continued oxidation of the underlying base metal 40, where a barrier layer 88 is not used.

Although the oxide coating 92 is produced by oxidizing the underlying barrier coating 88 in the embodiments illustrated above, alternately, it may be possible to apply and bond an oxide coating to the underlying barrier layer 88, comprising an oxide other than that of the base metal forming the barrier layer 88.

Although the embodiments of this disclosure have been described with respect to certain exemplary embodiments, it is to be understood that the specific embodiments are for purposes of illustration and not limitation, as other variations will occur to those of skill in the art.

What is claimed is:

1. A method of fabricating a hybrid metal-ceramic matrix composite structure, comprising:
    forming a reinforcing layer containing a metal reinforcement;
    coating the metal reinforcement with a second metal so as to form a metal coating that surrounds the metal reinforcement, the metal coating disposed on the metal reinforcement;
    oxidizing the metal coating so as to form an oxide layer coating on a surface of the metal coating, the oxide layer covering the metal coating;
    forming a layup following forming said oxide layer, including placing the reinforcing layer between plies comprising continuous ceramic fibers pre-impregnated with a ceramic matrix, the plies comprising woven or knitted sheets of the ceramic fibers;
    placing the layup between caul plates;
    sealing the caul plates and layup in a vacuum bag; and,
    curing the layup to bond the layers of ceramic fibers to the reinforcing layer including said oxide layer, curing in one of a platen press or an autoclave.

2. The method of claim 1, further comprising forming the reinforcing layer includes forming openings in sheet of metal.

3. The method of claim 1, wherein curing the layup includes heating the layup to temperatures sufficient to bond the oxide layer on the surface of the metal reinforcement to the ceramic fibers and the ceramic matrix in the autoclave at a temperature between approximately 150 to 450 degrees F. and pressure up to approximately 100 psi.

4. The method of claim 1, further comprising:
    sintering the ceramic matrix by heating the cured layup in a furnace for a preselected period of time at a temperature between approximately 500 to 2200 degrees F.

5. The method of claim 1, wherein the reinforcing layer comprises metal strips and forming the reinforcing layer includes forming a first reinforcing layer having metal strips at a first angle and forming a second reinforcing layer having metal strips at a second angle, the first angle and the second angle being different angles.

6. The method of claim 1, wherein:
    forming the reinforcing layer includes providing a foil comprising an Fe and Ni containing alloy, and
    forming the oxide layer on the surface of the metal reinforcement includes applying a nickel coating on the surface of the foil and heating the nickel coating to a temperature sufficient to oxidize the coating.

7. A method of fabricating a hybrid metal-ceramic matrix composite structure, comprising:
    providing multiple plies of continuous ceramic fibers pre impregnated with ceramic matrix, the plies comprising woven or knitted sheets;
    forming at least one reinforcing ply containing a continuous metal reinforcement having a coefficient of thermal expansion (CTE) generally matching the CTE of the ceramic fibers, the metal reinforcement in a form selected from one of sheets or strips;
    forming an oxide coating on a surface of the metal reinforcement;
    forming a layup following forming said oxide coating by placing the reinforcing ply between the multiple plies of ceramic fibers;
    placing the layup between a first caul plate and a second caul plate;
    sealing the caul plates and layup in a vacuum bag; and bonding the reinforcing ply including said oxide coating to the ceramic matrix by curing the layup at elevated temperature and pressure in an autoclave.

8. The method of claim 7, wherein forming the layer of oxide comprises:
applying a coating of metal to the surface of the metal reinforcement, and
oxidizing the metal coating.

9. The method of claim 7, wherein forming the reinforcing ply includes:
providing a sheet of nickel-cobalt ferrous alloy having the thermal expansion characteristics of borosilicate glass,
applying a nickel coating on the alloy sheet, and
heating the alloy sheet at a temperature of at least approximately 1500 degrees F. for at least approximately three hours to form an oxide layer that covers the nickel coating.

10. A method of fabricating a reinforced ceramic matrix composite structure for aerospace vehicles, comprising:
immersing plies of continuous fibers in a ceramic slurry, the plies comprising woven or knitted sheets so as to form prepreg ceramic fiber sheets with a ceramic matrix;
selecting a metal reinforcement having a coefficient of thermal expansion (CTE) substantially matching the CTE of the ceramic matrix, the metal reinforcement in the form of a sheet;
applying a metal coating on a the surface of the metal reinforcement;
oxidizing the metal coating at a temperature of at least approximately 1500 degrees F. for at least approximately three hours to form an oxide layer that covers the metal coating;
forming at least one reinforcing ply including the metal reinforcement, the metal coating, and the oxide layer;
forming a layup by placing the reinforcing ply between at least two of the prepreg ceramic fiber sheets with ceramic matrix;
placing the layup between a first caul plate and a second caul plate;
sealing the caul plates and layup in a vacuum bag;
curing and compacting the layup in an autoclave by subjecting the layup to heat between approximately 150 to 450 degrees F. and pressure up to approximately 100 psi to bond the reinforcing ply including said oxidized metal coating to the ceramic matrix; and,
sintering the layup after it has been curred and compacted in a furnace at a temperature between approximately 500 to 2200 degrees F.

11. The method of claim 1, wherein said a hybrid metal-ceramic matrix composite structure comprises an aircraft exhaust subassembly.

12. The method of claim 7, wherein said a hybrid metal-ceramic matrix composite structure comprises an aircraft exhaust subassembly.

13. The method of claim 1, wherein at least one of the plies is characterized by a coefficient of thermal expansion (CTE) substantially matching a CTE of the metal reinforcement.

14. The method of claim 1, wherein the continuous ceramic fibers include alumina and the ceramic matrix includes aluminosilicate.

15. The method of claim 1, wherein the metal reinforcement comprises a base nickel-cobalt ferrous alloy having the thermal expansion characteristics of borosilicate glass, and a nickel coating.

16. The method of claim 1, wherein the metal reinforcement comprises a sheet.

17. The method of claim 10, wherein the metal reinforcement comprises a nickel cobalt ferrous alloy, the metal coating comprises nickel, and the oxide layer comprises nickel oxide.

18. The method of claim 17, wherein the ceramic fibers comprise alumina and the ceramic matrix comprises aluminosilicate.

19. The method of claim 18, wherein the metal reinforcement includes at least approximately 100 openings per square inch.

20. The method of claim 18, wherein the layup comprises a stack in the following order, two plies of prepreg ceramic fiber sheets, one reinforcing ply, eight plies of prepreg ceramic fiber sheets, one sheet of reinforcing ply, and two plies prepreg ceramic fiber sheets.

\* \* \* \* \*